United States Patent Office 3,701,599
Patented Oct. 31, 1972

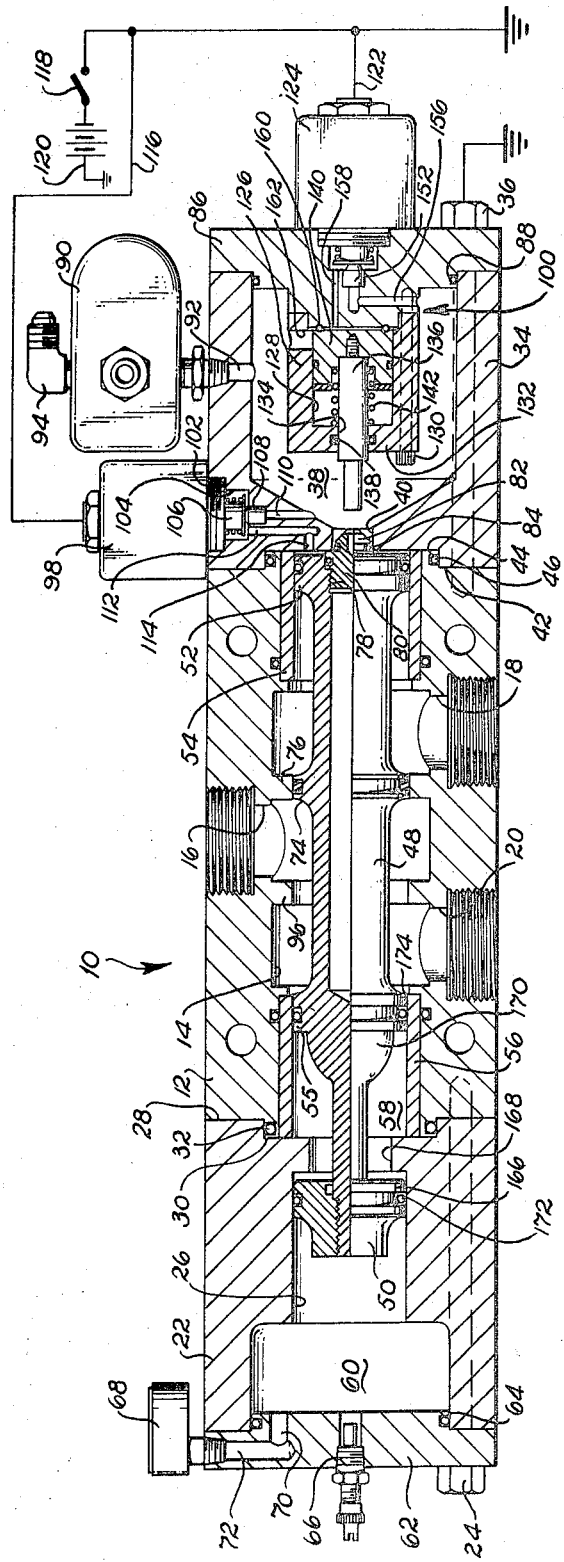

3,701,599
FAST ACTING VALVE
William K. Stewart, Ontario, Calif., assignor to
Seco-Dyn, Inc.
Filed Nov. 25, 1970, Ser. No. 92,134
Int. Cl. F16k *11/02*
U.S. Cl. 137—625.48                            11 Claims

ABSTRACT OF THE DISCLOSURE

A fast acting spool type valve having an inlet port, a normally open outlet port and a normally closed outlet port. Low pressure is applied to continuously urge the spool assembly to a forward position in communication with a high pressure chamber to an extent insufficient to overcome the low pressure force. A solenoid valve, aided by an electromechanical booster, shifts the spool to apply the high pressure against a portion of the spool sufficient to overcome the forward pressure and accelerate the spool to its rear position. A constant-volume dampening chamber effects smooth deceleration of the spool assembly.

FIELD OF THE INVENTION

The field of art to which the invention pertains includes the field of fluid handling systems, particularly valves.

BACKGROUND AND SUMMARY OF THE INVENTION

The term "fluid" as used herein is intended to be generic to both hydraulic fluid and pneumatic fluid.

There are many instances where it is desirable to rapidly divert the flow of fluid under pressure. The present invention provides a fast-acting valve for use under relatively high pressure. A spool type valve is provided having an inlet port, a normally closed outlet port and a normally open outlet port. Fluid under low, fixed pressure is applied to the rear end of the spool to continuously urge the spool assembly to a forward position in which the forward end of the spool communicates with a high pressure chamber. A limited portion only of the forward spool end closes a passageway leading to the high pressure chamber so that the pressure therein acts only against such limited portion, resulting in a force insufficient to overcome the fixed low pressure force. Upon actuation, a solenoid valve diverts pressure from the high pressure chamber to impact against greater portions of the forward spool end which, in conjunction with a simultaneously actuated electromechanical booster, shifts the spool assembly toward its rear position. This opens the passageway to the high pressure chamber to allow the fluid therein to act over the entire forward spool end to thereby rapidly propel the spool assembly to its rear position, opening the normally-closed port and closing the normally-open port. A constant-volume dampening chamber effects smooth deceleration of the spool assembly.

In accordance with the specific embodiment disclosed herein, to divert pressure from the high pressure chamber, a conduit is formed through the valve housing from the high pressure chamber to the plunger of a solenoid and from there to the forward spool end. When the solenoid is actuated, the plunger moves to admit fluid under high pressure against the forward spool end forcing it out of the aforementioned passageway. The electromechanical booster is located in the high pressure chamber and includes a cylinder formed with a bore in which is disposed a piston carrying a spring loaded shaft. One end of the shaft extends through the cylinder with its impact end adjacent the aforementioned passageway so as to impact against the forward spool end when the booster is actuated. A solenoid valve is associated with the booster cylinder to direct fluid from the high pressure chamber against the piston to accelerate and impact the shaft against the spool end. This impact action plus the static force delivered by the booster following impact plus the fluid diversion of the first mentioned solenoid, results in a rapid shift of the spool end from the passageway releasing the fluid from the high pressure chamber to act over the entire forward surface of the spool.

The constant volume dampening chamber is defined by forward and rear lands carried by the spool in slidable relation in said bore on opposite sides of a deceleration orifice defined by decreased bore diameter portions. A protrusion is formed on the spool extending into the dampening chamber on the forward side of the deceleration orifice whereby to effect a pressure differential across the deceleration orifice as the spool approaches its rear position to thereby control deceleration of the spool.

BRIEF DESCRIPTION OF THE DRAWINGS

FIG. 1 is a partially schematic, cross-sectional view of a valve constructed in accordance with this invention; and
FIG. 2 is a more detailed, cross-sectional view of one of the solenoid valves illustrated in FIG. 1.

DETAILED DESCRIPTION

Referring to FIG. 1, there is illustrated a fast acting valve 10 including a valve body 12 defining a bore 14 having an inlet port 16 and forward and rear outlet ports 18 and 20. An end block 22 is secured rearwardly to the valve body 12 by means for four hexagon head bolts 24 (only one of which is shown) and is formed with a central bore 26. The end block 22 is formed with a forward shoulder 28 which engages an annular rear flange on the body 12 about an O-ring 32 to align the bores 26 and 14 in fluid tight communication. Similarly, an end block 34 is secured by bolts such as 36 to the forward end of the body 12. The forward end block 34 is formed with a high pressure chamber 38, which will be described hereinafter in more detail, and a passageway 40 thereinto. The forward end block 34 is formed with a rear shoulder 42 which engages an annular forward flange 44 on the body 12 about an O-ring 46 to align the passageway 40 in fluid tight communication with the bore 14.

A spool assembly 48 is disposed within the bore 14 and carries a piston 50 at its rear end extending into the end block bore 26. The piston assembly 48 carries a forward piston 52 which is slidably received within a friction reducing sleeve 54 in the main body bore 14. The spool assembly 48 also includes a land 55 disposed within a sleeve 56 secured at the opposite end of the bore 14. The confronting surfaces of the land 55 and piston 50 define with the sleeve 56 and bore 26 a dampening chamber 58 which will be described in more detail hereinafter.

The bore 26 in the rear end block 22 is enlarged rearwardly to form a pressure chamber 60 enclosed by an end cover 62 with a fluid-tight O-ring seal 64 and secured by means of the aforementioned bolts 24. Fluid under pressure (e.g., 25 p.s.i.) is introduced into the chamber 60 through a valve 66 and monitored by means of a pressure gauge 68 connected into the chamber via conduits 70 and 72. The fluid in the chamber 60 remains in the valve 10 at all times and applies a fixed pressure continuously acting on the piston 50 to urge the spool assembly 48 to its forwardmost position as shown in FIG. 1.

The spool assembly carries a main sealing land 74 which when the spool assembly 48 is in its forwardmost position slidably engages a reduced bore diameter portion defining an internal forward land 76 so as to thereby effect a seal between the inlet port 16 and the normally-closed outlet port 18. In this position, there is free communication between the inlet port 16 and the normally-open outlet port 20.

The force of the fixed pressure in the rear chamber 60 causes the forward piston 52 to contact the forward face of the end block 34. The forward end of the piston 52 is centrally formed with a threaded recess 78 into which is threadably secured a seal plug 80 having a forward portion 82 of truncated conical shape protruding into the end block passageway 40. The conical portion 82 carries an O ring seal 84 which effects fluid tight closure with the end block 34 portion defining the passageway 40. In this manner, only the conical portion 82 of the piston-plug assembly 52–80 is exposed to the high pressure chamber 38. The chamber 38 is enclosed by a forward end cover 86, fluid-tight with an O-ring seal 88 and secured by means of the aforementioned bolts 36. A solenoid valve 90 is connected into the chamber 38 by means of a conduit 92 through the end block 34 and is connected via a coupling 94 to a source of fluid under pressure of about 125–150 p.s.i. The solenoid valve 90 can be opened to introduce fluid under such pressure into the chamber 38.

Referring now to specific dimensions to illustrate the balance of forces within the system, the piston 50 has an effective rear surface area of 2.075 square inches. The 25 p.s.i. pressure in the chamber 60 thus continuously urges the spool assembly 48 against the forward end block 34 with a force of 52 pounds. The effective forward surface area of the conical seal plug portion 82 is 0.307 square inch which at 150 p.s.i. pressure in the chamber 38 effects an opposing force of only 46 pounds with the result that the valve remains in its "normal," forward position.

The object at this point is to cause the seal plug 80 to withdraw from the end block passageway 40 so as to allow the 150 p.s.i. pressure in the chamber 38 to act over the entire forward surface of the piston 52. The piston 52 has an overall effective forward surface of 2.075 square inches so that a force on the spool assembly of 311 pounds can be produced. This force minus the opposing force of 52 pounds results in a new force of 259 pounds to accelerate the spool assembly 48 and displace it 1.437 inches to its near position. At this rear position, the sealing land 74 slidably engages a reduced bore diameter portion defining an internal land 96 so as to close the normally-open port 20 and simultaneously open the normally-closed port 18. The spool assembly 48 is of relatively light weight such that the net force of 259 pounds acts to accelerate the spool to its rear position in 0.001 second or less. Due to the fact that the lands 55, 74 and 52 are of the same size and area the inlet pressure at port 16 as well as pressures at ports 18 and 20 has no effect upon the rate of motion of the spool 48.

Withdrawal of the seal plug 80 from the end block passageway 40 is accomplished by means of the conjunctive action of a control solenoid 98 and a booster unit 100. The control solenoid 98 is threadably secured into a threaded recess 102 in one side of the end block 34 which continues as a chamber 104 for receiving the solenoid plunger 106. In its unactuated position, the solenoid plunger 106 bears against an orifice bearing 108 which is connected via a conduit 110 into the high pressure chamber 38. Conduits 112 and 114 lead from the plunger chamber 104 to the main body bore 14 adjacent the forward surface of the piston 52 outboard of the seal plug 80. The solenoid 98 is connected over a line 116 via a switch 118 to a source of current 120 so that when the switch 118 is closed, the solenoid is actuated to withdraw its plunger 106. When the solenoid plunger 106 is withdrawn, fluid from the high pressure chamber 38 flows through the conduits 110, 112, 114 to thereby act against the forward surface of the piston 52 outboard of the seal plug 80.

Simultaneously, as indicated by the line 122, a solenoid valve 124 operates to actuate the booster unit 100. The booster unit 100 includes a cylinder 126 formed with a piston bore 128 and is sealed at one end by engagement, via four bolts 130 (only one of which is shown) with the rear surface of the forward end cover 86. The rear end of the cylinder 126 is closed by a wall 132 which is formed with an opening 134 through which a shaft 136 is slidably disposed in fluid-tight relation by means of an O-ring seal 138. The shaft 136 is carried rearwardly by a piston 140 disposed within the cylinder bore 128 and which is spring loaded against the inner surface of the rear wall 132 by means of a spring 142 disposed around the shaft 136.

The booster unit 100 is actuated by energizing the solenoid valve 124 and operates to accelerate the booster shaft 136 rearwardly so as to impact against the forward surface of the seal plug 80. This impact action plus the static force that the booster is capable of delivering greatly assists the action of the control solenoid 98 in shifting the spool assembly 48 rearwardly.

Referring additionally to FIG. 2, the booster solenoid 124 is threadably secured into a threaded recess 144 centrally in the forward end cover 86 which continues as a chamber 146 for receiving the solenoid plunger 148. The plunger is formed with a bearing plug 150 at its free end, which when the solenoid is in its unactuated position, bears against an orifice bearing 152 which is connected via conduits 154, 156 into the high pressure plunger chamber 38. Another conduit 158 leads from the plunger chamber 146 to the booster cylinder piston bore 128 adjacent the forward end of the booster piston 140. A face seal 160 (FIG. 1) surrounds the conduit 158 opening. Four port holes 162 (only one of which is shown) are formed through the cylinder 126 into the port 128 radially close to the face seal 160. In operation, the booster spring 142 forces the forward surface of the piston 140 against the face seal 160, thereby sealing communication between the high pressure chamber 38 and the forward surface of the piston 140 inboard of the face seal 160. When the fluid under 150 p.s.i. pressure is introduced into the high pressure chamber 38, it acts over the entire rear surface of the booster shaft 136, which, having an effective area of 0.147 square inch produces a force on the face seal 160 of 22 pounds in addition to the force of the booster spring 142. Fluid under 150 p.s.i. pressure is also allowed to flow through the four cylinder ports 162 and act against the forward surface of the piston 140, but only on the area thereof outboard of the face seal 160. This force is less than the force produced by the spring and aforementioned pressure acting on the booster shaft 136.

Referring again to FIG. 2, when the booster solenoid valve 124 is energized, its plunger 148 is drawn away from the orifice bearing 152 to thereby allow fluid under 150 p.s.i. pressure to flow through the end cover conduits 156, 154, into the chamber 146 and out through the conduit 158, as indicated by the dashed arrow 164, to act against the forward surface of the piston 140 on the area inboard of the face seal 160. When the sum of the forces produced by the pressure on the inboard area and outboard forward surface areas of the piston 140 is slightly greater than the sum of the opposite forces produced by the booster spring 142 and 22 pounds of pressure acting on the rear surface of the booster shaft 136, the piston 140 moves away from the rear surface of the end cover 86 and away from the face seal 160. This movement allows the fluid under 150 p.s.i. pressure from the chamber 38 to flow through the cylinder ports 162 and act directly against the entire forward surface of the piston 140. This action then causes the piston 140 to accelerate toward the spool assembly 48 to impact the shaft 136 against the forward surface of the seal plug 80.

The sum of this impact action, the static force delivered by the booster following impact and the aforementioned action of the control solenoid valve in diverting fluid from the high pressure chamber 38, results in a rapid escape of the seal plug 80 and its O ring seal 84 from the end block passageway 40. The fluid from the high pressure chamber 38 then acts directly against the entire forward surface of the forward spool piston 52 to accelerate the spool assembly 48 to its rear position. Rearward displacement of the spool assembly 48 shifts the main sealing land 74 out of engagement with the forward bore land 76 and into engagement with the rear bore land 96 to open the normally-closed port 18 and close the normally-open port 20.

The foregoing actions result in a rapid and forceful displacement of the spool assembly 48 which unless decelerated in a controlled manner could result in excessive wear of the components. Deceleration is accomplished by means of the previously mentioned dampening chamber 58. The rear piston 50 is formed with a forward land portion 166, the forward surface thereof confronting the rear surface of the land 55 which, in conjunction with the bore 26 and inner surfaces of the rear sleeve 56, define a substantially constant volume dampening chamber 58. The position of the chamber 58 is shiftable in accordance with movement of the spool assembly 48.

The rear end block 22 defines a decrease diameter portion between the spool lands 166 and 55 which, in turn, defines a deceleration orifice 168 within the dampening chamber 58. The spool assembly 48 is formed with a convexly contoured protrusion 170 extending from the rear surface of the land 55 toward the deceleration orifice 168. The dampening chamber 58 is filled with fluid which is preferably a liquid and which is maintained in the chamber 58 by means of fluid tight O ring seals 172 and 174 carried by the lands 166 and 55.

In operation, as the spool assembly 48 moves rearwardly, the chamber 58 shifts with respect to the deceleration orifice 168. When the contoured protrusion 170 begins to enter the deceleration orifice, a controlled fluid pressure-drop occurs effecting a pressure differential across the deceleration orifice which causes a controlled fluid pressure to act against the rear surface of the protrusion 170 and land 55 to thereby safety decelerate the spool and reduce its velocity to zero.

In order to return the valve to its original position, the solenoid valves 90, 98 and 124 need merely be deenergized. Each of these valves are "three-way" valves resulting in exhaustion of the fluid. Referring again to FIG. 2, the manner of such exhaustion is illustrated with respect to the solenoid valve 124, but its operation is similar with respect to each of the other valves 90 and 98. As shown in FIG. 2, upon deenergizing the solenoid valve 124, the piston 148 returns to its spring loaded original position with its bearing plug 150 sealing the orifice bearing 152. The plunger 148 includes a forward bearing plug 176 which, when the solenoid 124 is actuated bears against an exhaust orifice 178 preventing escape of pressure through the conduit 158 and space 180 along the sides of the plunger 148. Upon deenergization, the exhaust orifice is exposed allowing fluid in the conduit 158 and space 180 to exhaust, as indicated by the arrow 182. If the fluid is gaseous, it can exhaust directly to the atmosphere; otherwise a reservoir is provided. The result is the loss of force against the forward surface of the piston 140 whereupon the force of the spring 142 carries the piston 140 and shaft 136 rearwardly into the booster cylinder 126. This action allows the spool assembly 48 to be returned to its forward position as a result of force of the pressure in the low pressure chamber 60 against the rear surface of the piston 50. The forward conical portion 82 of the seal plug 80 is pushed into the end block passageway 40 and sealed therein by means of the O-ring seal 84. The valve is thus returned to its normal position in which the normally-open outlet port 20 communicates with the inlet port 16 and the normally-closed outlet port 18 is closed.

As required, a detailed illustrative embodiment of the invention has been disclosed. However, it is to be understood that this embodiment merely exemplifies the invention which may take forms radically different from the specific illustrative embodiment disclosed. Therefore, specific structural and functional details are not to be interpreted as limiting, but merely as a basis for the claims which define the scope of the invention. In this regard, the illustrative embodiment herein comprises a single inlet port, a single normally-closed outlet port and a single normally-open outlet port, but similar valves can be provided in in "four-way" arrangements, or as otherwise desired.

I claim:
1. A fast acting valve, comprising:
   a housing defining a bore having flow ports therein, a chamber adjacent a forward end of said bore and a passageway between said chamber and said bore;
   a valve member in said bore for movement between forward and rear positions to control fluid flow through said flow ports;
   said valve member having a forward end slidably positioned in said bore whereby a forwardmost portion only of said forward valve member end closes said passageway when said valve member is in said forward position;
   means for continuously urging said valve member to said forward position;
   means for applying superatmospheric fluid pressure in said forward end chamber, against said forwardmost portion while said passageway is closed by said forwardmost portion, which is insufficient to overcome said continuously urging means when directed against said forwardmost end portion only of said valve member but which is suffiicent to overcome said continuously urging means when applied against a predetermined portion of said forward valve member end greater than said forwardmost portion; and
   control means for applying said forward end chamber fluid pressure over a greater portion of said forward valve member end whereby to move said valve member to said rear position.

2. The invention according to claim 1 in which said control means comprises a conduit defined by said housing from said forward chamber to said forward valve member end portion and selectively actuable means for opening and closing said conduit.

3. The invention according to claim 1 in which said control means comprises a solenoid having a movable plunger, a conduit defined by said housing from said forward chamber to said plunger, and a conduit defined by said housing from said plunger to said forwardmost valve member and portion.

4. The invention according to claim 1 in which said valve member has a rear end positioned in said bore, said housing defines a rear chamber thereat and said continuously urging means comprises means for applying pressure in said rear chamber against said rear valve member end.

5. The invention according to claim 1 including means for dampening movement of said valve member as it approaches said rear position.

6. The invention according to claim 1 in which said flow ports comprise an inlet port and first and second outlet ports, said valve member comprising a spool carrying a land between said first and second outlet ports to define said first and second outlet ports as normally closed and normally opened, respectively, said land respectively opening and closing said first and second outlet ports upon movement of said valve member to said rear position.

7. The invention according to claim 6 in which said land is formed with substantially equal opposite surface areas between said first and second outlet ports.

8. A fast acting valve, comprising:
   a housing defining a bore having flow ports therein, a chamber at a forward end of said bore and a passageway between said chamber and said bore;
   a valve member in said bore for movement between forward and rear positions to control fluid flow through said flow ports;

said valve member having a forward end slidably positioned in said bore whereby a limited portion only of said forward end closed said passageway when said valve member is in said forward position;

means for continuously urging said valve member to said forward position;

means for applying fluid pressure in said end chamber which is insufficient to overcome said continuously urging means when directed against said limited forward end portion but which is sufficient to overcome said continuously urging means when applied against a predetermined portion of said forward and greater than said limited portion; and control means for applying said fluid pressure over a greater portion of said forward end whereby to move said valve member to said rear position, comprising an impact member in said chamber adjacent said limited forward end portion and means for impacting said impact member against said limited forward end portion whereby to move said valve member rearwardly.

9. A fast acting valve, comprising:

a housing defining a bore having flow ports therein, a chamber at a forward end of said bore and a passageway between said chamber and said bore;

a valve member in said bore for movement between forward and rear positions to control fluid flow through said flow ports;

said valve member having a forward end slidably positioned in said bore whereby a limited portion only of said forward end closes said passageway when said valve member is in said forward position;

means for continuously urging said valve member to said forward position;

means for applying fluid pressure in said end chamber which is insufficient to overcome said continuously urging means when directed against said limited forward end portion but which is sufficient to overcome said continuously urging means when applied against a predetermined portion of said forward end greater than said limited portion; and control means for applying said fluid pressure over a a greater portion of said forward end whereby to move said valve member to said rear position, comprising a conduit defined by said housing from said chamber to said forward end portion, selectively actuable means for opening and closing said conduit, and an impact member in said chamber adjacent said limited forward end portion and means for impacting said impact member against said limited forward end portion substantially simultaneously with actuation of said selectively actuable means whereby to aid movement of said valve member toward said second position.

10. A fast acting valve, comprising:

a housing defining a bore having flow ports therein, a chamber at a forward end of said bore and a passageway between said chamber and said bore;

a valve member in said bore for movement between forward and rear positions to control fluid flow through said flow ports;

said valve member having a forward end slidably positioned in said bore whereby a limited portion only of said forward end closes said passageway when said valve member is in said forward position;

means for continuously urging said valve member to said forward position;

means for applying fluid pressure in said end chamber which is insufficient to overcome said continuously urging means when directed against said limited forward end portion but which is sufficient to overcome said continuously urging means when applied against a predetermined portion of said forward end greater than said limited portion;

control means for applying said fluid pressure over a greater portion of said forward end whereby to move said valve member to said rear position, and;

a shaft in said chamber having a first end adjacent said limited forward end portion, means in said chamber defining a bore, a piston in said bore carrying the other end of said shaft, and selectively actuable means for diverting pressure from said end chamber against said piston whereby to impact said shaft's first end against said limited forward end portion to move said valve member rearwardly.

11. A fast acting valve, comprising:

a housing defining a bore having flow ports therein, a chamber at a forward end of said bore and a passageway between said chamber and said bore;

a valve member in said bore for movement between forward and rear positions to control fluid flow through said flow ports;

said valve member having a forward end slidably positioned in said bore whereby a limited portion only of said forward end closes said passageway when said valve member is in said forward position;

means for continuously urging said valve member to said forward position;

means for applying fluid pressure in said end chamber which is insufficient to overcome said continuously urging means when directed against said limited forward end portion but which is sufficient to overcome said continuously urging means when applied against a predetermined portion of said forward end greater than said limited portion;

control means for applying said fluid pressure over a greater portion of said forward end whereby to move said valve member to said rear position; and means for dampening movement of said valve member as it approaches said rear position, comprising a decreased bore diameter portion defining a deceleration orifice in said bore, forward and rear lands carried by said valve member in slidable relation in said bore on opposite sides of said deceleration orifice where whereby to define a substantially constant volume dampening chamber, and a protrusion carried in said dampening chamber by said valve member forward of said deceleration orifice whereby to effect a pressure differential across said deceleration orifice as said valve member approaches its rear position to thereby control deceleration of said valve.

References Cited

UNITED STATES PATENTS

| | | | |
|---|---|---|---|
| 3,351,316 | 11/1967 | Lewis et al. | 137—625.48 X |
| 2,035,533 | 3/1936 | Campbell | 137—625.48 X |
| 2,045,823 | 6/1936 | Barrow | 137—625.48 X |
| 2,955,617 | 10/1960 | Collins | 137—625.64 |
| 3,308,851 | 3/1967 | Zoludom | 137—625.48 |
| 3,384,122 | 5/1968 | Harpman | 137—625.64 |
| 3,415,282 | 12/1968 | Zoludom | 137—625.48 |

SAMUEL SCOTT, Primary Examiner